US012505831B2

(12) United States Patent
Shabat et al.

(10) Patent No.: US 12,505,831 B2
(45) Date of Patent: Dec. 23, 2025

(54) ENABLING LARGE LANGUAGE MODEL-BASED SPOKEN LANGUAGE UNDERSTANDING (SLU) SYSTEMS TO LEVERAGE BOTH AUDIO DATA AND TEXTUAL DATA IN PROCESSING SPOKEN UTTERANCES

(71) Applicant: GOOGLE LLC, Mountain View, CA (US)

(72) Inventors: Nir Shabat, Geva (IL); Volodymyr Polosukhin, Ramat Gan (IL); Shlomo Fruchter, Ness Ziona (IL); Golan Pundak, New York, NY (US); Roy Atsmon, Tel-Aviv (IL)

(73) Assignee: GOOGLE LLC, Mountain View, CA (US)

( * ) Notice: Subject to any disclaimer, the term of this patent is extended or adjusted under 35 U.S.C. 154(b) by 338 days.

(21) Appl. No.: 18/081,569

(22) Filed: Dec. 14, 2022

(65) Prior Publication Data

US 2024/0203404 A1   Jun. 20, 2024

(51) Int. Cl.
*G10L 15/26*   (2006.01)
*G10L 13/027*   (2013.01)
*G10L 15/18*   (2013.01)

(52) U.S. Cl.
CPC ........ *G10L 15/1815* (2013.01); *G10L 13/027* (2013.01); *G10L 15/26* (2013.01)

(58) Field of Classification Search
None
See application file for complete search history.

(56) References Cited

U.S. PATENT DOCUMENTS

| | | | |
|---|---|---|---|
| 6,366,882 B1 | 4/2002 | Bijl et al. | |
| 11,355,122 B1* | 6/2022 | Gonzalez | G10L 21/10 |
| 12,334,049 B2* | 6/2025 | Aharoni | G10L 15/22 |
| 2005/0033582 A1* | 2/2005 | Gadd | G10L 15/26 |
| | | | 704/E15.04 |
| 2005/0125224 A1 | 6/2005 | Myers et al. | |
| 2014/0337032 A1* | 11/2014 | Aleksic | G10L 15/26 |
| | | | 704/257 |
| 2019/0018843 A1 | 1/2019 | Och et al. | |
| 2019/0130917 A1* | 5/2019 | Pogorelik | G06F 40/169 |
| 2019/0362712 A1 | 11/2019 | Karpukhin | |

(Continued)

OTHER PUBLICATIONS

Zhu et al., "A Synchronized Word Representation Method With Dual Perceptual Information" Digital Object Identifier. IEEE Access. DOI: 10.1109/ACCESS.2020.2969983. 10 pages, dated Dec. 30, 2019.

(Continued)

*Primary Examiner* — Neeraj Sharma
(74) *Attorney, Agent, or Firm* — Gray Ice Higdon

(57) ABSTRACT

In various implementations, a method implemented by one or more processors of a computing device can comprise receiving audio data that captures a spoken utterance of a user; processing the audio data using an automatic speech recognition (ASR) model to generate textual data corresponding to the spoken utterance; generating a semantic representation corresponding to the spoken utterance of the user based on applying both the audio data and the textual data as input across a large language model (LLM); and causing the semantic representation corresponding to the spoken utterance of the user to be utilized in fulfilling the spoken utterance.

16 Claims, 10 Drawing Sheets

(56) References Cited

U.S. PATENT DOCUMENTS

| | | | |
|---|---|---|---|
| 2020/0357388 A1* | 11/2020 | Zhao | G06N 3/08 |
| 2021/0056956 A1 | 2/2021 | Dimitriadis et al. | |
| 2022/0004825 A1* | 1/2022 | Xie | G06N 3/045 |
| 2022/0230628 A1* | 7/2022 | Zhu | G10L 15/063 |
| 2022/0270594 A1* | 8/2022 | Sejpal | G06N 3/045 |
| 2023/0041517 A1* | 2/2023 | Golikov | G01D 21/02 |
| 2023/0169281 A1* | 6/2023 | Zheng | G10L 15/28 |
| | | | 704/2 |
| 2023/0317066 A1* | 10/2023 | Hueser | G10L 15/063 |
| | | | 704/243 |

OTHER PUBLICATIONS

European Patent Office; Invitation to Pay Additional Fees issued in Application No. PCT/US2022/053054; 9 pages; dated Jul. 26, 2023.
European Patent Office; International Search Report and Written Opinion issued in Application No. PCT/US2022/053054; 16 pages; dated Sep. 18, 2023.
European Patent Office, Intention to Grant issued in Application No. 22851181.2; 50 pages; dated Apr. 30, 2025.

\* cited by examiner

ENABLING LARGE LANGUAGE MODEL-BASED SPOKEN LANGUAGE UNDERSTANDING (SLU) SYSTEMS TO LEVERAGE BOTH AUDIO DATA AND TEXTUAL DATA IN PROCESSING SPOKEN UTTERANCES

BACKGROUND

Some Spoken Language Understanding (SLU) systems include an Automatic Speech Recognition (ASR) module for transcribing input speech into text, and a Natural Language Understanding (NLU) module that processes the transcribed speech to determine a structured semantic representation of the text. This structured semantic representation, (which may be in the form of domain, intents, slots, etc.) can then be consumed by downstream components of the system (e.g. to determine one or more actions for an automated assistant to perform, to determine a response to the speech input, etc.).

Modern ASR modules are typically trained using a large amount (e.g. thousands of hours) of annotated speech data. As such, creating a new ASR module can be relatively expensive (e.g. in terms of computational resources, time, effort, etc.) both in obtaining and annotating the training data, and in producing an accurate ASR module. As a result, these ASR modules may be offered as external services (e.g. by cloud providers) in a one-size-fits-all fashion (e.g., to perform reasonably well over various audio and language domains). However, in some cases, SLU systems are used in applications in particular (e.g. narrow) domains. For example, in an application of automating phone calls for making reservations at restaurants, it may be desired that the SLU system has an ASR module that provides good support for phone audio and phrasing revolving around booking reservations and various menu items.

Large, pre-trained transformer-based language models (such as LaMDA, BERT, T5, Meena, GPT-3, etc.), which may also be referred to as large language models, or LLMs, may be used in order to perform Natural Language Processing (NLP). These models can enable transfer learning of general-purpose knowledge into a specific NLP task. This may be achieved by fine-tuning a pre-trained LLM model using examples from the target NLP task. For instance, an NLU module of a SLU system may utilize a pre-trained LLM that is fine-tuned based on the target NLP task. Since the NLU module is LLM-based, only transcripts, which may be generated by processing raw audio data by an ASR module of the SLU system, are used in fine-tuning. However, by only using the transcripts in fine-tuning the pre-trained LLM (e.g., and not the audio data), various potential benefits of the SLU system are not realized.

SUMMARY

Techniques are described herein for providing an improved LLM-based SLU system. In many cases, training data obtained for improving an NLU module (e.g., by fine-tuning the LLM, as described herein) is initially obtained in raw form as audio data. The improved LLM-based SLU system can thus leverage the audio data (in addition to textual data generated based on processing the audio data using an ASR module of the SLU system (also referred to herein as a transcript or transcription)) in determining semantics of a spoken utterance from a user. Furthermore, techniques are described herein for fine-tuning a pre-trained LLM on both textual data and audio data. During the fine-tuning, techniques described herein leverage transfer learning from a pre-trained LLM and a model pre-trained on audio (e.g., an audio encoder).

The pre-training of an audio encoder can be performed in various ways. For instance, the pre-training of the audio encoder can involve self-supervised training from domain data obtained for the specific task of the SLU system. This pre-training may be, for instance, based on a denoising or contrastive objective (e.g. wav2vec, w2v-b, etc.). As another example, the pre-training of the audio encoder can involve self-supervised training from a mix of domain and non-domain data. In addition, the domain data can be enriched with additional audio data sources (e.g. audio data from online video sharing websites, etc.). As another example, an encoder of an ASR module can be utilized as the pre-trained audio model.

Techniques described herein give rise to various technical advantages and benefits. For instance, by directly using the audio data (in addition to the textual data) for predicting semantics, information contained in the audio data, but not in the textual data (e.g. non-verbal speech cues) can be utilized. This may allow for, for instance, paralinguistics in the audio data to be leveraged, which carries additional semantic information (e.g. prosody) to differentiate statements from questions, loudness and pitch for sentiment, etc. As another example, in some languages, intonation of a particular word may change its meaning. As such, if only the textual data that is predicted to correspond to such a word is used, the meaning of the word may be incorrectly inferred. By also considering the audio data capturing the utterance of the word, the intonation of the word can also be considered, thus allowing the intended meaning of the word to be more accurately inferred.

Furthermore, use of the audio data may allow for compensating for low quality ASR, e.g. if the ASR module was trained in one acoustic domain (or as e.g. a "one size fits all" model, as described above), and the application is using another (or more particular) domain. In this way, the improved LLM-based SLU system may provide improved performance in determining a structured semantic representation of textual data that is predicted to correspond to words spoken by a user, particularly in a specified domain. In addition, as compared to, for instance, preparing a bespoke ASR module for the specified domain, the techniques described herein are relatively low cost (e.g. in terms of time, effort, computational resources, etc.).

DETAILED DESCRIPTION

Figure 1A:
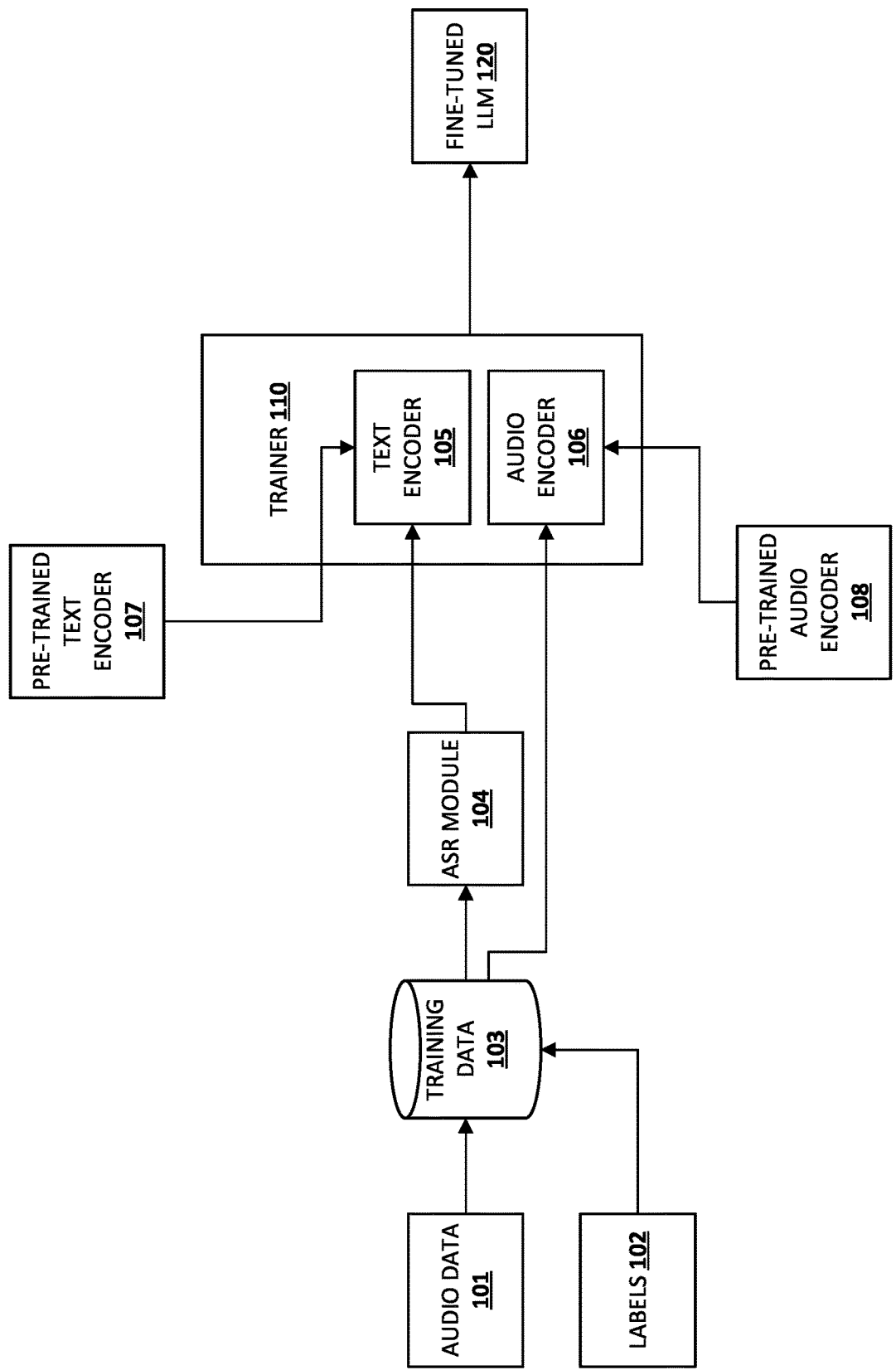
FIG. 1A depicts an example process flow of fine-tuning large language models, in accordance with various implementations.

FIG. 1A depicts an example process flow of fine-tuning large language models, in accordance with various implementations. Briefly, and as described in more detail below, the trainer 110 fine-tunes an LLM thereby resulting in the fine-tuned LLM 120. During a training phase, the trainer 110 may use training data 103 (e.g. from previous telephone conversations and/or other data sources) to train the LLM. During a subsequent inference phase, the fine-tuned LLM 120 may be used to provide semantic representations of spoken utterances based on both audio data capturing a spoken utterance and textual data corresponding to the spoken utterance.

In more detail, training data 103 can include audio data 101 which captures spoken utterances and labels 102 for the audio data 101, where the labels 102 are indicative of a semantic representation of the spoken utterances. For instance, a given instance of training data may include audio data capturing a spoken utterance and a label indicative of an intent corresponding to the spoken utterance.

Figure 2:
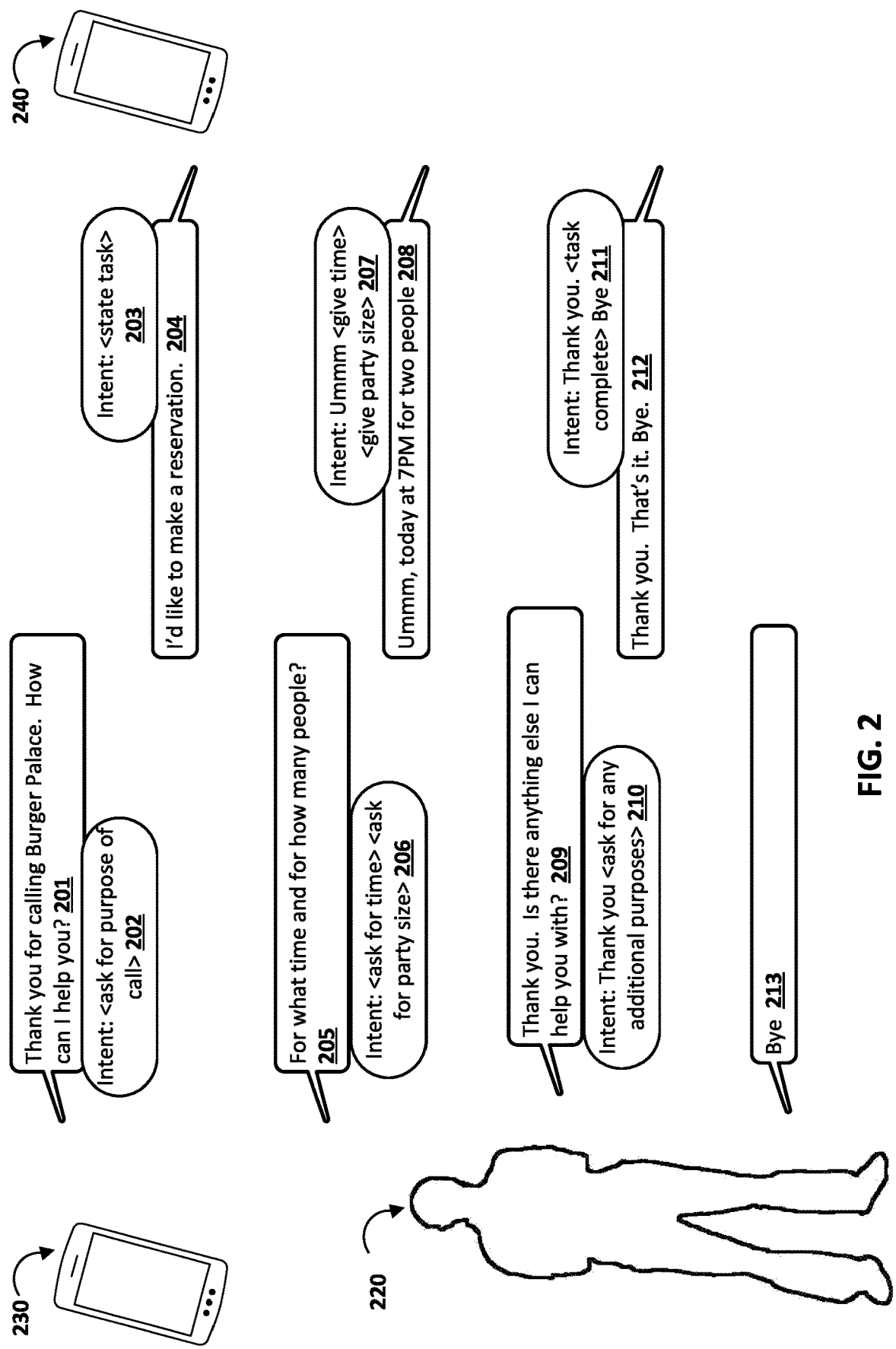
FIG. 2 depicts a non-limiting example of a dialogue session between a user and an automated assistant where the automated assistant utilizes large language model(s) in generating assistant output(s), in accordance with various implementations.

In a conversation between more than one participant, a spoken utterance (or simply utterance) may include what a speaker says before another speaker says something. This may be similar to a line of dialogue. As another example, an utterance may include a spoken command directed to an automated assistant. An utterance may be more than one sentence or less than a complete sentence. For example, and referring briefly to FIG. 2, utterance 201 includes two sentences. FIG. 2 also includes other examples of utterances, such as utterance 205, utterance 209, and utterance 213. The synthesized utterances of FIG. 2 204, 208, and 211 may also be utterances. In some implementations, the audio data 101 in the training data 103 may not include audio data of synthesized utterances.

Referring back to FIG. 1A, semantic representations may include, for instance, one or more of domain, intent, slots, and/or other data to semantically represent spoken utterances. For instance, for a given spoken utterance (or a transcription thereof), a high-level domain can be identified. In this instance, intent detection and slot filling can be performed according to the predicted domain's semantic template. Further, intent detection identifies the finergrained intent class a given transcript belongs to. Moreover, slot filling (or also known as argument prediction) is the task of extracting semantic components, like the argument values corresponding to the domain.

In some implementations, and as noted above, the audio data 101 in the training data 103 may capture telephone conversations. These telephone conversations may be between two humans, a human and an automated assistant, and/or in other scenarios. They may be obtained during performance of particular tasks in various domains, such as making a reservation at a restaurant, scheduling an appointment at a hair salon, scheduling an appointment at a car mechanic, or any other similar task that may require placing a telephone call in respective domains. As another example, the audio data 101 of the training data 103 may capture spoken utterances provided by a user in order to cause an automated assistant to perform one or more operations (e.g. querying a search engine based on the spoken utterance, setting a calendar appointment in a user's calendar, sending an email, etc.).

In some implementations, the choice of domain of the training data may depend on the task(s) in which the LLM is intended to perform. For instance, if the LLM is intended to be used in an application involving automatically making restaurant reservations via a telephone call (e.g. as described in relation to FIG. 2), training data 103 including examples of telephone conversations in which a restaurant reservation was made can be obtained. In this way, the LLM can be fine-tuned according to the particular task or domain in which the LLM is intended to be used. As such, performance of the LLM for this task or in this domain can be improved. In other implementations, the training data may not be limited to any particular domain. In this way, the LLM can be fine-tuned according to various tasks or various domains in which the LLM is intended to be used. As such, performance of the LLM across the various tasks or in these various domains can be improved.

The audio data 101 can be processed by ASR module 104 in order to generate textual data corresponding to the spoken utterance captured by the audio data 101 (e.g. an unstructured free-form natural language input). The ASR module 104 can process, using one or more ASR model(s) (e.g., a recurrent neural network (RNN) model, a transformer model, and/or any other type of machine learning (ML) model capable of performing ASR), a stream of audio data that captures spoken utterances to generate a stream of ASR output. The stream of ASR output can include, for example, a stream of ASR hypotheses (e.g., term hypotheses and/or transcription hypotheses) that are predicted to correspond to spoken utterance(s) of a user that are captured in the stream of audio data, one or more corresponding predicted values (e.g., probabilities, log likelihoods, and/or other values) for each of the ASR hypotheses, a plurality of phonemes that are predicted to correspond to spoken utterance(s) of a user that are captured in the stream of audio data, and/or other ASR output. The ASR module 104 can select one or more of the ASR hypotheses as recognized text that corresponds to the spoken utterance (e.g., based on the corresponding predicted values).

In some implementations, the textual data may be predetermined and stored, along with the audio data 101 and the labels 102, as training data 103. In this case, the audio data 101 need not be processed again by ASR module 104.

In some implementations, the labels 102 can be obtained based on NLU output generated based on processing the audio data 101 with an NLU engine. The NLU output can include, for example, annotated recognized text that includes one or more annotations of text recognized from the audio data 101 (e.g. using an ASR module) for one or more (e.g., all) of the terms of the recognized text. For example, the NLU engine may include a part of speech tagger configured to annotate terms with their grammatical roles.

Additionally, or alternatively, the NLU engine may include an entity tagger configured to annotate entity references in one or more segments of the recognized text, such as references to people (including, for instance, literary characters, celebrities, public figures, etc.), organizations, locations (real and imaginary), and so forth. In some implementations, data about entities may be stored in one or more databases, such as in a knowledge graph. In some implementations, the knowledge graph may include nodes that represent known entities (and in some cases, entity attributes), as well as edges that connect the nodes and represent relationships between the entities. The entity tagger may annotate references to an entity at a high level of granularity (e.g., to enable identification of all references to an entity class such as people) and/or a lower level of granularity (e.g., to enable identification of all references to a particular entity such as a particular person, particular place, etc.). The entity tagger may rely on content of the unstructured free-form natural language input to resolve a particular entity and/or may optionally communicate with a knowledge graph or other entity database to resolve a particular entity. Additionally, or alternatively, the NLU engine may include a coreference resolver configured to group, or "cluster," references to the same entity based on one or more contextual cues. For example, the coreference resolver may be utilized to resolve the term "them" to "buy theater tickets" in the natural language input "buy them", based on "theater tickets" being mentioned in a automated assistant response rendered immediately prior to receiving input "buy them".

In some implementations, one or more components of the NLU engine may rely on annotations from one or more other components of the NLU engine. For example, in some implementations the entity tagger may rely on annotations from the coreference resolver in annotating all mentions to a particular entity. Also, for example, in some implementations, the coreference resolver may rely on annotations from the entity tagger in clustering references to the same entity. Also, for example, in some implementations, the coreference resolver may rely on user data in coreference resolution and/or entity resolution. The user data may include, for example, historical location data, historical temporal data, user preference data, user account data, calendar data, email data, and/or any other user data.

In some additional or alternative implementations, the labels 102 can be obtained based on prior annotation of the audio data 101 (and/or textual data generated from the audio data 101) by one or more human operators.

The LLM may be initialized with a pre-trained text encoder 107 and a pre-trained audio encoder 108. In other words, at an initial stage prior to fine-tuning, the pre-trained text encoder 107 may be used as the text encoder 105 of the LLM, and the pre-trained audio encoder 108 may be used as the audio encoder 106 of the LLM. The pre-trained text encoder 107 can be trained to provide one or more text encodings based on processing a textual data input.

For example, the textual data input for a given instance of training data can be determined based on the stream of ASR output generated by the ASR module 104 in processing the audio data 101 for the given instance of training data. Further, the textual data input can be processed using the pre-trained text encoder 107 to generate the one or more text encodings. Notably, the one or more text encodings may preserve semantic information (e.g. semantic meaning) of the textual data input. For instance, the one or more text encodings may include one or more text embeddings representing semantic information in the textual data input or any other text encodings capable of preserving the semantic information of the text data input.

The pre-trained text encoder 107 may be a previously trained ML model or a combination of various previously trained ML models that can be fine-tuned. For example, the pre-trained text encoder 107 may itself correspond to a LLM, such as LaMDA, BERT, T5, Meena, GPT-3, and/or another previously trained LLM. Notably, these previously trained LLMs have been previously trained on enormous amounts of diverse data. These LLMs have a plurality of ML layers and hundreds of millions to hundreds of billions of ML parameters. For example, textual data may be provided as input across these previously trained LLMs to generate LLM output, such as a probability distribution over intents, and one or more intents present in the textual data may be determined based on the probability distribution over the intents.

The pre-trained audio encoder 108 can be pre-trained in various ways. For example, the pre-training of the pre-trained audio encoder 108 can involve self-supervised training from domain data obtained for the specific task which the LLM is intended to perform. This pre-training may be, for instance, based on a denoising or contrastive objective (e.g. wav2vec, w2v-b, etc.). As another example, the pre-training of the pre-trained audio encoder 108 can involve self-supervised training from a mix of domain and non-domain data. In addition, the domain data can be enriched with additional audio data sources (e.g. audio data from online video sharing websites, etc.). As yet another example, an encoder of an ASR module (e.g. the ASR module 104, or a different ASR module) can be utilized as the pre-trained audio encoder 108. For instance, the pre-trained audio encoder 108 can be provided as a conformer model. Further, the pre-trained audio encoder 108 can be trained to provide one or more audio encodings based on processing an audio data input.

For example, the audio data input for a given instance of training data can be obtained. Further, the audio data input can be processed using the pre-trained audio encoder 108 to generate the one or more audio encodings. Similar to the one or more text encodings described above, the one or more audio encodings may preserve semantic information (e.g. semantic meaning), but with respect to a spoken utterance captured in the audio data input. For instance, the one or more text encodings may include one or more audio embeddings representing semantic information in the spoken utterance captured in the audio data input or any other audio encodings capable of preserving the semantic information of the audio data input.

During the training phase, the trainer 110 may utilize various fine-tuning techniques to generate the fine-tuned LLM 120 by fine-tuning the initialized LLM (including the text encoder 105 and the audio encoder 106) and based on the training data 103 (e.g. the audio data 101, the labels 102 for the audio data 101, and the textual data generated by the ASR module 104 in processing the audio data 101). These fine-tuning techniques may include, but are not limited to, instruction tuning, few-shot learning, and/or other fine-tuning techniques, and the fine-tuning performed may vary based on the training data 103. Put another way, the initialized LLM (and the text encoder 105 and the audio encoder 106) may be further trained based on the training data 103, such that the initialized LLM that is fine-tuned to leverage the audio data. By fine-tuning the initialized LLM, the resulting fine-tuned LLM 120 leverages the capabilities of the initialized LLM in processing textual data while also being fine-tuned to leverage the audio data associated with instances of the training data 103. The fine-tuned LLM may be subsequently utilized during an inference phase (e.g. as described in relation to FIG. 1B, or FIG. 2).

Figure 1B:
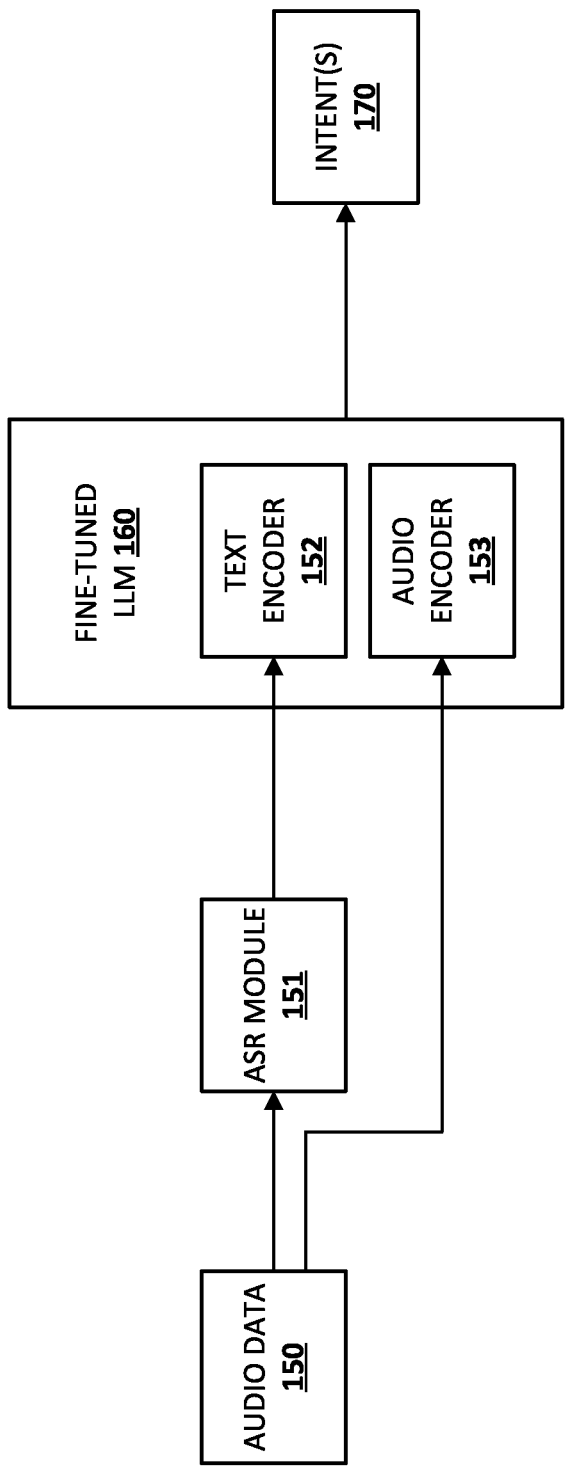
FIG. 1B depicts an example process flow of utilizing fine-tuned large language models, in accordance with various implementations.

FIG. 1B depicts an example process flow of utilizing fine-tuned large language models, in accordance with various implementations.

Audio data 150 can be captured by one or more microphones of a client device or received by the client device from an additional client device. The audio data 150 can include one or more spoken utterances. For example, the audio data 150 may be part of a conversation between two (or more) participants (e.g. humans, automated assistants, etc.). For instance, the audio data 150 may capture spoken utterances provided by the participants as part of a telephone conversation during performance of particular tasks such as making a reservation at a restaurant, scheduling an appointment at a hair salon, scheduling an appointment at a car mechanic, or any other similar task that may require placing a telephone call. As another example, the audio data 150 may capture spoken utterances provided by a single user and that are provided in order to cause an automated assistant to perform one or more operations. For instance, the audio data 150 may capture spoken utterances provided by the user querying a search engine based on a spoken utterance, setting a calendar appointment in a user's calendar based on a spoken utterance, sending an email based on a spoken utterance, etc.

In various implementations, the audio data 150 can include a plurality of spoken utterances. The plurality of spoken utterances may be provided by a single speaker or by multiple speakers over multiple turns of dialogue such as when the audio data 150 is captured as part of a conversation between two (or more) participants. In this case, the audio data 150 may be processed to provide segments of the audio data containing a single spoken utterance (or a subset of the plurality of spoken utterances) for further processing. For instance, the audio data 150 may be processed to provide segments according to the turns of dialogue such that each segment includes a spoken utterance(s) from only a single speaker.

The audio data 150 can be processed by ASR module 151 to generate textual data corresponding to the spoken utterance(s) included in the audio data 150. The textual data can then by processed by the text encoder 152 of the fine-tuned LLM 160 (e.g., an instance of the fine-tuned LLM 120 that is fine-tuned according to the process flow of FIG. 1A). As discussed in relation to FIG. 1A, the text encoder 152 has been trained during the training phase to provide one or more text encodings based on processing a textual data input (e.g., generated using the ASR module 151). As a result, and during the inference phase described in relation to FIG. 1B, the text encoder 152 can determine a text encoding for each token (e.g. sentences, words, characters, subwords, etc.) in the textual data input, and output a sequence of the text encodings. The one or more text encodings may preserve semantic information (e.g. semantic meaning) of the textual data input. For instance, and as noted above in relation to FIG. 1A, the one or more text encodings may include one or more text embeddings representing semantic information in the textual data input.

The audio data 150 can also be processed by the audio encoder 153 of the fine-tuned LLM 160. As discussed in relation to FIG. 1A, the audio encoder 153 has been trained to provide one or more audio encodings based on processing an audio data input. As a result, and during the inference phase described in relation to FIG. 1B, the audio encoder 153 can determine an audio encoding for each frame of audio in the audio data, and provide a sequence of the determined audio encodings. The one or more audio encodings may preserve semantic information (e.g. semantic meaning) of spoken utterance(s) contained in the audio data input. For instance, and as noted above in relation to FIG. 1A, the one or more audio encodings may include one or more audio embeddings representing semantic information in the spoken utterance(s) contained in the audio data input.

In some implementations, the audio data 150 processed by the audio encoder 153 can be synchronized with the textual data that is generated by the ASR module 151 and that is processed by the text encoder 152. This synchronization ensures that encodings of the sentences/words/tokens of the spoken utterance captured in the audio data are aligned with the corresponding sentences/words/tokens in the textual information. As such, the semantic information of sentences/words/tokens generated from both the one or more text encodings and the one or more audio encodings can be associated with one another. For instance, the semantic information relating to the intonation of a particular spoken word captured in the audio data can be determined to correspond to a particular spoken word in the textual data. This may be performed, for instance, by attentioning the textual data to the audio data 150, as described in further detail in relation to FIG. 3C.

Accordingly, the fine-tuned LLM 160 can, based on processing the textual data with the text encoder 152 and the audio encoder 153, provide one or more semantic representations corresponding to the spoken utterance in the audio data 150. For instance, as depicted in FIG. 1B, the fine-tuned LLM 160 can generate predicted intent(s) 170 (or simply intent(s) 170) of the spoken utterance in the audio data 140 and one or more corresponding slot values for one or more parameters associated with each of the one or more predicted intents.

In some implementations, the semantic representation of the spoken utterance(s) captured in the audio data 150 (e.g. the intent(s) 170) can be used in determining and synthesizing a response to the spoken utterance(s) captured in the audio data 150. For instance, an automated assistant or other downstream system may process the semantic representation to determine and synthesize a response to the input spoken utterance (e.g. to conduct automated telephone conversations as described in relation to FIG. 2, to fulfil an assistant query, etc.). As an example, in some implementations, the automated assistant or the other downstream system can determine a set of candidate responses, and rank the set of candidate responses according to one or more ranking criteria. The one or more ranking criteria can include, for example, one or more predicted measures (e.g., ASR measures generated in generating the textual data by the ASR module 151, NLU measures generated in determining the semantic representation of the spoken utterance, fulfillment measures generated in generating the set of candidate responses) that are indicative of how responsive each of the candidate responses included in the set of candidate responses are predicted to be to the spoken utterance included in the spoken utterance, the semantic representation of the spoken utterance(s) captured in the audio data 150, and/or other ranking criteria. In some implementations, the semantic representation (e.g. intent(s) 170) can be used in generating translated textual content corresponding to the spoken utterance in a similar way.

In additional or alternative implementations, the semantic representation (e.g. the intent(s) 170) can be used in determining and causing performance of one or more actions (e.g. assistant actions). The determination of the actions may be performed in a similar manner as described in relation to determining and synthesizing a response to the input spoken utterance of the user.

In additional or alternative implementations, the semantic representation (e.g. the intent(s) 170) can be used to refine the textual data generated by the ASR module 151. For instance, since the semantic information generated by the fine-tuned LLM 160 may leverage additional information (e.g. intonation information) as compared to the ASR module 151 generating textual data, the semantic information generated by the fine-tuned LLM 160 may be considered to more accurately reflect the intended semantic information in the spoken utterance of the user. As such, if it is determined that the ASR module 151 has incorrectly inferred any semantic information in generating the textual data (e.g. if it is inconsistent with the semantic information generated by the fine-tuned LLM 160), the semantic information generated by the fine-tuned LLM 160 can be used to correct the textual data. The refined textual data can then be further processed (e.g. to fulfil the spoken utterance), presented to a user, and/or stored for later use.

FIG. 2 depicts an example application of the fine-tuned LLM in accordance with various implementations described herein. In particular, FIG. 2 depicts a non-limiting example of a dialogue session between a human representative 220 and an automated assistant executing at least in part at a client device 240 of a user. In the example of FIG. 2, the automated assistant utilizes the fine-tuned LLM (e.g. the fine-tuned LLM of FIG. 1A or 1B) in generating assistant output(s), in accordance with various implementations.

Briefly, assume that the automated assistant is performing a task for the user of the client device 240 by placing a telephone call. The telephone call can be placed locally by the client device 240, or by a remote computing system (e.g., a remote server) that is in communication with the client device 240. Further assume that the human representative 220 answers the telephone call and has a telephone conversation with the automated assistant via a respective client device 230 of the human representative 220. During the telephone call, the automated assistant can utilize intents determined based on processing both instances of audio data capturing spoken utterances of the human representative 220 and instances of textual data corresponding to the spoken utterance in determining how the automated assistant should respond to the spoken utterances of the human representative 220.

In more detail, a user may be interacting with the automated assistant at the client device 240 and request that the automated assistant make a reservation for Burger Palace that same day for two people at 7:00 pm. Burger Palace may be a small restaurant that does not have an online portal where the automated assistant can request the reservation. Instead, prospective patrons must call Burger Palace on the telephone to make a reservation. In this case, the automated assistant initiates a telephone call with the restaurant and attempts to make the reservation on behalf of the user of the client device 240.

The automated assistant can be provided with information related to the request. The information may include the requested date and time for the reservation, the name of the restaurant, and the number of people in the party. For requests other than restaurant reservations, the information may include the name of a requested service provider, a description of any type of problem for the service provider to address, and any other similar information.

The automated assistant can initiate a telephone call with Burger Palace and the human representative 220 can answer the telephone call via the client device 230. The human representative 220 speaks the utterance 201 by saying, "Thank you for calling Burger Palace. How can I help you?" The automated assistant detects the utterance 201. The automated assistant analyzes the current state (e.g. based at least on a determined intent of the spoken utterance 201) of the call in generating an appropriate response to the utterance 201. In some implementations, generating an appropriate response may be further based on conversation context data, any previous intents from portions of the telephone conversation spoken by the human representative 220 or by the automated assistant, etc. The conversation context data may include additional information such as the identity of the entity the human representative 220 represents, the time of day of the telephone call, the day of week of the telephone call, the task that the automated assistant is attempting to complete, the location of the restaurant, the location of the user requesting the reservation, and/or any other similar contextual information. In some implementations, the conversation context data may change as the conversation progresses. For example, if the location of the user requesting the reservation changes, then the corresponding data in the context data may change.

An intent of a portion of the telephone conversation represents, in the example of FIG. 2, a template of a summary of what the human representative 220 said. The intent can also be used as a template for what the automated assistant has said or will say. However, it should be understood that the intent is not limited to such templates. An intent may identify, for instance, the type of information included in the portion of the telephone conversation. In some implementations, different portions of telephone conversations may correspond to the same intent but have different transcriptions in the templates. For example, the intent of <ask for purpose of call> may correspond to the transcription of "How can I help you?," "How can I direct your call?", "May I help you?", or any other similar portion of a telephone conversation.

In the example shown in FIG. 2, the automated assistant receives the audio data of the utterance 201. The automated assistant determines an intent 202 of <ask for purpose of call> for spoken utterance 201 by utilizing the fine-tuned LLM, as described, for instance, in relation to FIG. 1B (e.g. by applying both the audio data and textual data corresponding to the spoken utterance as input across the fine-tuned LLM). Based at least in part on the determined intent 202 of spoken utterance 201, the automated assistant determines an intent 203 that provides a framework for a reply that the automated assistant will speak responsive to the utterance 201, such as the intent 203 of <state task>. The automated assistant can then generate a transcription based on the intent 203. In this instance, the automated assistant generates the transcription, "I'd like to make a reservation." and generates the synthesized utterance 204 (e.g., by processing the transcription using text-to-speech model(s)) that is output to the human representative 220 via the client device 230 and over a VoIP network or other telephonic network.

Generating an intent for responding to a spoken utterance, generating a transcription, and generating synthesized audio for a synthesized utterance may be performed with any suitable method. For instance, in some implementations, the fine-tuned LLM described herein may form part of a larger model which may perform one or more of these operations. The larger model may provide one or more outputs which can include, for example, a probability distribution over a sequence of one or more words and/or phrases across one or more vocabularies, and one or more of the words and/or phrases in the sequence can be selected as the one or more outputs based on the probability distribution. In additional or alternative implementations, the fine-tuned LLM described herein may output an intent, which may be utilized by one or more downstream systems or models to perform these operations.

Further, the human representative 220 hears the synthesized utterance 204 of "I'd like to make a reservation." The human representative 220 responds by speaking utterance 205, "For what time and how many people?". The automated assistant receives the audio of the utterance 205 and responsively determines an intent 206 of <ask for time>, <ask for party size> for spoken utterance 205 (e.g. by applying both the audio data and textual data corresponding to the spoken utterance as input across the fine-tuned LLM). The automated assistant can then, based at least on the determined intent 206, determine the intent 207 that provides a framework for generating the synthesized utterance 208. Based on the intent 207, the automated assistant can generate the transcription for the synthesized utterance 208, and generate the audio of the synthesized utterance 208 to be output to human representative 220. In this instance, the intent 207 is "ummm <give time> <give party size>." and thus the automated assistant generates the synthesized utterance 208 of the complete transcription "ummm, today at 7 pm for two people."

Moreover, the human representative 220 hears the synthesized utterance 208 of "Ummm, today at 7 pm for two people.". The human representative 220 responds by speaking utterance 209, "Thank you. Is there anything else I can help with?". The automated assistant receives the audio of the utterance 208, determines the intent 210 of "Thank you <ask for any additional purposes>" for the spoken utterance 208, and responsively determines the intent 211 that provides a framework for generating the synthesized utterance 212. The automated assistant generates the transcription for the synthesized utterance 212 based on the intent 211, and generates the audio of the synthesized utterance 212 to be output to the human representative 220. In this instance, the intent 211 is "Thank you. <task complete>. Bye." Similar to intent 207, intent 211 may include terms that should be included in the transcription. The automated assistant generates the intent 211 that includes the terms "thank you" and "bye." These terms may not convey any particular information to the human representative 220 and may be included to better mimic human conversation. The automated assistant generates the transcription "that's it" to match the <task complete> intent, and combines the terms "thank you" and "bye" with "that's it" in the order specified by the intent 211 to generate "Thank you. That's it. Bye.". The automated assistant generates the synthesized utterance 212 of the complete transcription "Thank you. That's it. Bye."

Lastly, the human representative 220 hears the synthesized utterance 212 of "Thank you. That's it. Bye.". The human representative 220 responds by speaking utterance 213, "Bye." The automated assistant receives the audio of the utterance 213. At this point, the conversation is complete. The automated assistant determines a null intent which indicates that the human representative 220 has ended the telephone conversation. Based on the null intent, the automated assistant may hang up the phone.

Although intents are generally referred to in relation to FIG. 2, it will be understood that other semantic representations (e.g. domain, slots, etc.) may additionally or alternatively be used. Further, although a particular interaction is depicted in FIG. 2 (e.g. the automated assistant initiating a telephone call with Burger Place on behalf of the user of the client device 240), it should be understood that is for the sake of example and is not meant to be limiting.

Figure 3A:
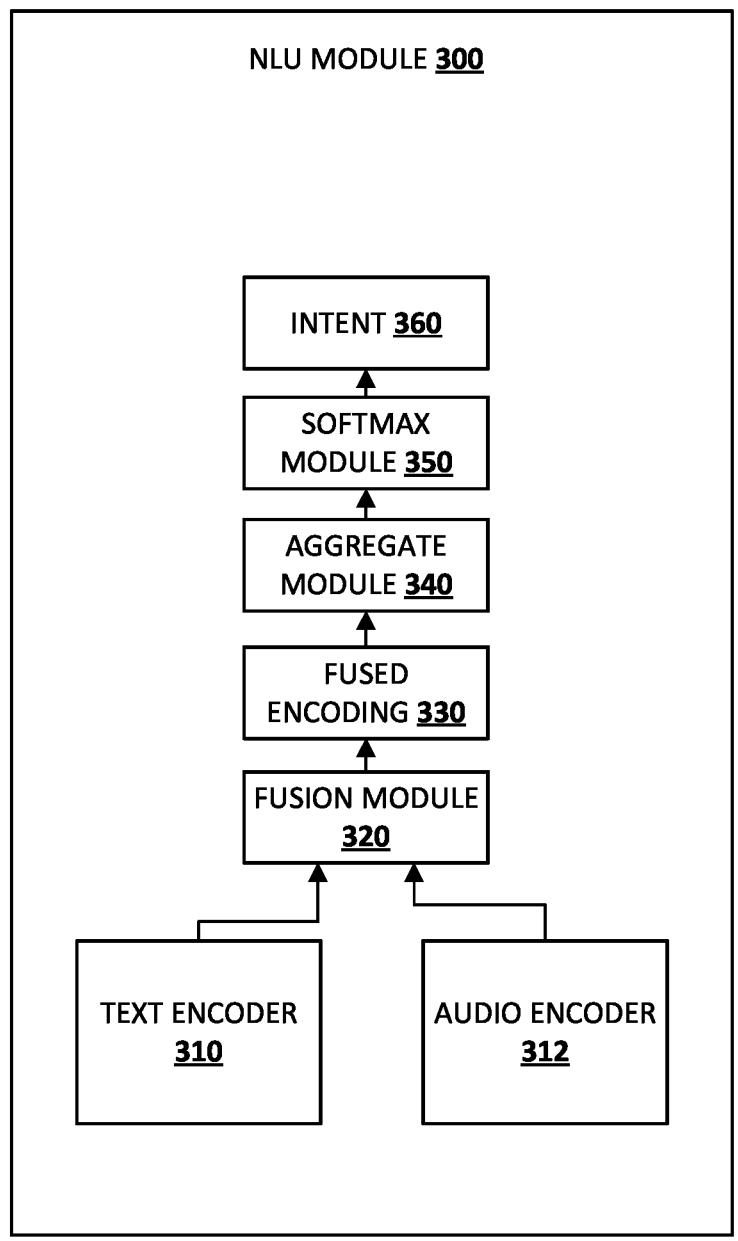
FIG. 3A, FIG. 3B, FIG. 3C and FIG. 3D depict example architectures of large language model-based natural language understanding modules in accordance with various implementations.

FIG. 3A depicts an example architecture of a large language model-based natural language understanding module in accordance with various implementations.

As depicted in FIG. 3A, an NLU module 300 can include an audio encoder 312 and a text encoder 310. The NLU module 300 can be a fine-tuned LLM that is fine-tuned as described herein (e.g. the fine-tuned LLM 120 of FIG. 1A or the fine-tuned LLM 160 of FIG. 1B). As described in relation to FIG. 1A, the audio encoder 312 can be trained to provide one or more audio encodings based on processing an audio data input. For instance, the audio encoder 312 can determine an audio encoding for each audio frame in the audio data input, and provide a sequence of the determined audio encodings. The one or more audio encodings may preserve semantic information (e.g. semantic meaning) of one or more spoken utterance(s) present in the audio data input. For instance, the one or more audio encodings may include one or more audio embeddings representing semantic information in the one or more spoken utterances present in the audio data input. Similarly, the text encoder 310 can be trained to provide one or more text encodings based on processing a textual data input. For instance, the text encoder 310 can determine a text encoding for each token (e.g. sentence, word, character, subword, etc.) in the textual data input, and provide a sequence of the determined text encodings. In some implementations, the textual data may be tokenized, for instance, prior to being processed by the text encoder 310, or as part of being processed by the text encoder 310. The one or more text encodings may preserve semantic information (e.g. semantic meaning) of the textual data input. For instance, the one or more text encodings may include one or more text embeddings representing semantic information in the textual data input.

The encodings provided by the audio encoder 312 and the text encoder 310 respectively can be combined in a fusion module 320. This may be performed in any suitable manner. For instance, some non-limiting examples are described in relation to FIGS. 3B, 3C and 3D, the encodings can be combined by means of a concatenation module 321, an attention module 322, an addition module 324, etc.

Figure 3B:
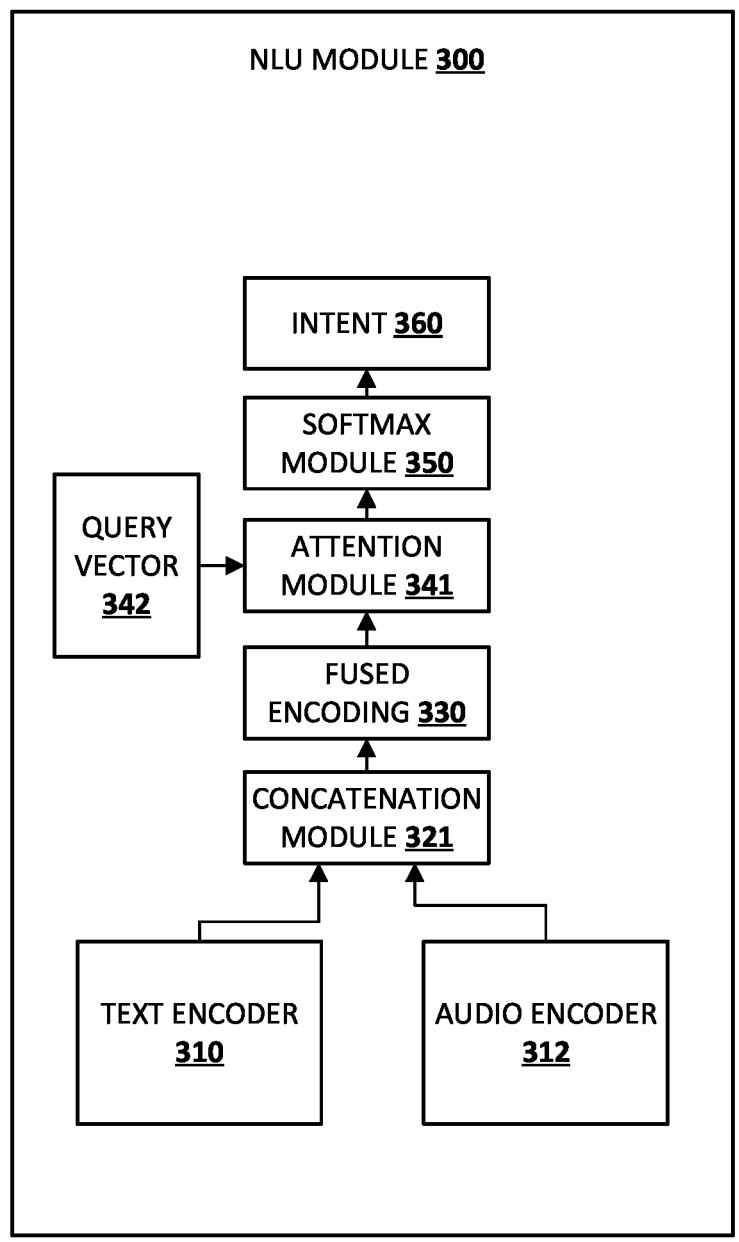
Figure 3C:
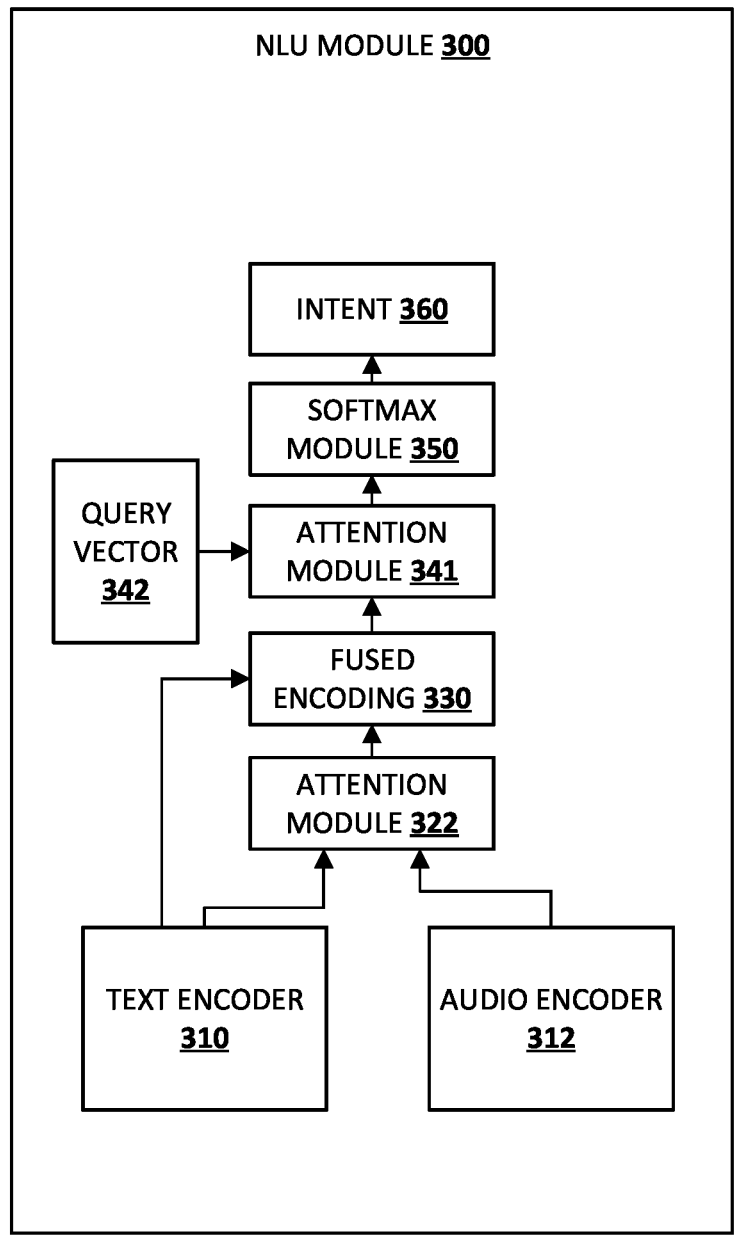
Figure 3D:
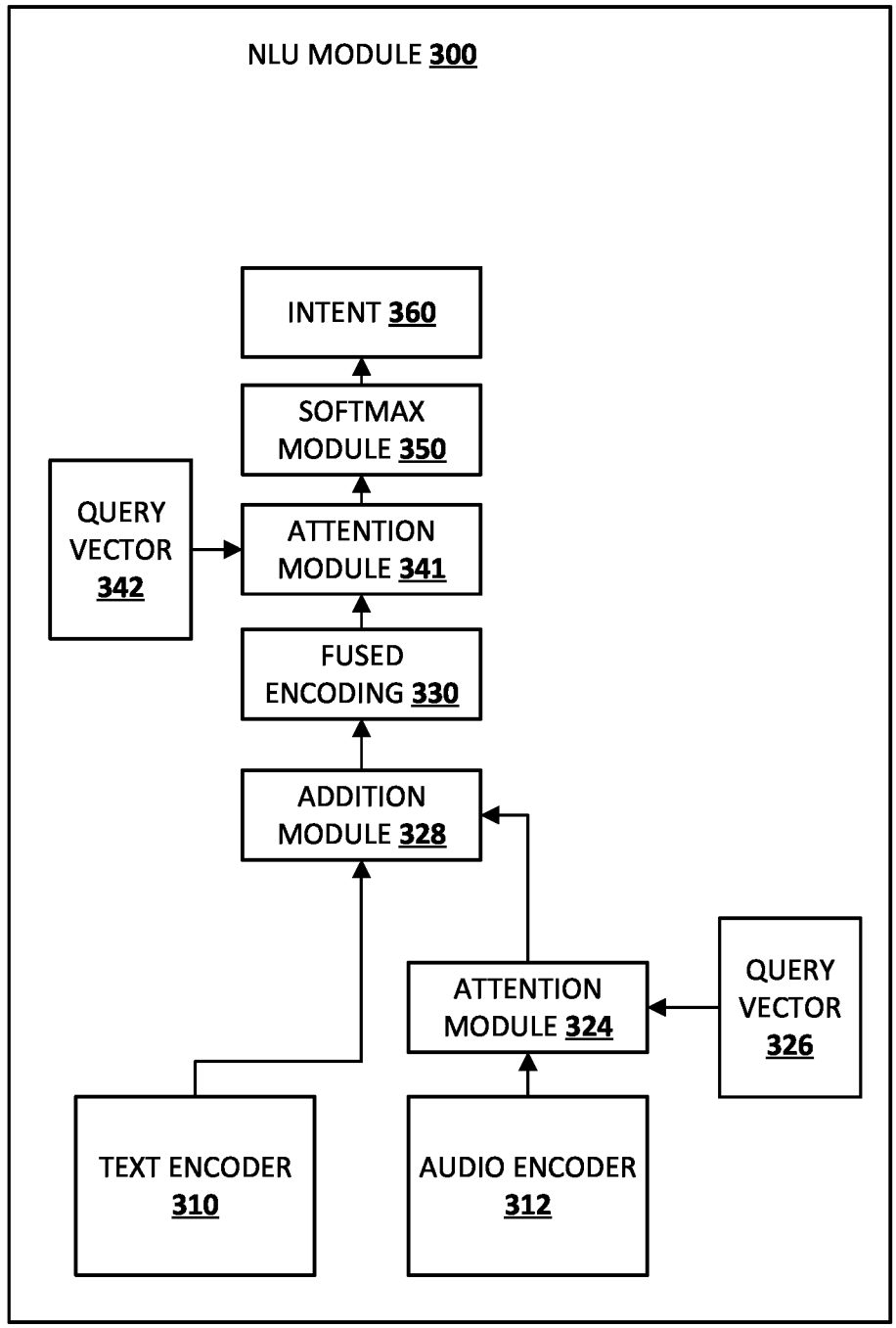

The combined encodings can then be processed by aggregation module 340 to provide an aggregated encoding. For instance, the aggregation may be performed by means of an attention mechanism (e.g. attention module 341 as depicted in FIGS. 3B, 3C, and 3D). The aggregated encodings can be processed by softmax module 350 to provide an output encoding. The output encoding can be representative of semantic information of the one or more spoken utterance(s). Put another way, the softmax module 350 can process the aggregated encoding to provide a probability distribution over a plurality of outcomes. For instance, the probability distribution may be over a plurality of possible embeddings (e.g. indicative of intents). In this way, the output of the softmax module 350 can be indicative of one or more intent 360 corresponding to the spoken utterance.

FIGS. 3B, 3C, and 3D depict various example implementations of the architecture of the LLM-based NLU module as depicted in FIG. 3A. For brevity, only the differences between the examples will be discussed in detail herein.

As depicted in FIG. 3B, the encoding from the audio encoder 312 and the text encoder 310 can be fused by concatenation module 321. Concatenation module 321 can concatenate the audio encoding and the text encoding to provide fused encoding 330.

In some implementations, the dimensions of the audio encoding and the text encoding (or sequences thereof) output by the audio encoder 312 and the text encoder 310 respectively may not be the same. In this case, prior to concatenation, one or both of the encodings can be projected to a predefined dimension (which may be a hyperparameter of the LLM), such that the dimension of the respective projected encodings are the same. The projection function used to project the encodings may be learned during the fine-tuning of the LLM.

The fused encoding 330 can then be aggregated by attention module 341. The attention module 341 can apply attention to the fused encoding 330. For instance, the attention module 341 can utilize transformer attention (e.g. multi-headed scaled dot product attention). The query vector

342 used by the attention module may be, for instance, provided as a constant vector of 1s. The query vector 342 can be of the same dimension as the predefined dimension which the encodings have been projected in to. In this way, the output embedding can be generated by considering context from the entire sequence of the fused encoding (e.g. based on each of the tokens in the textual data input and each of the audio frames in the audio data input).

As depicted in FIG. 3C, the audio encoding output by the audio encoder 312 and the text encoding output by the text encoder 310 can be fused by attention module 322. One or both of the encodings (or sequences thereof) can be projected to a predefined dimension, prior to fusion of the encodings (e.g. in a similar manner as described in relation to FIG. 3B. The attention module 322 can attend the text encodings over to the audio encodings. For instance, the attention module 322 can take attention from a particular text encoding in the sequence of text encodings (corresponding to a particular token in the textual data) over each one of the audio encodings in the sequence of audio encodings to determine a context vector for each text encoding. The context vectors can then be summed with the sequence of text encodings. This results in a sequence of weighted sum audio embeddings, the sequence being of the same length as the text encodings. A residual connection from the sequence of text encodings to the resulting sequence can also be included. In this way, an association between tokens in the textual data and corresponding audio frames in the audio data can be maintained. In other words, the textual data and the audio data can be synchronized. The resulting sequence can then be aggregated by attention module 341 (e.g. in a manner similar to that described in relation to FIG. 3B).

In some implementations, it may be assumed that the input audio data (and corresponding textual data) includes a single spoken utterance. For instance, the input audio data may be processed (e.g. by an endpointer or one or more components of an ASR system such as ASR module 151 of FIG. 1B) such that the input audio data includes a single spoken utterance. In this case, explicit synchronization of the audio data and the textual data (e.g. by linking the text encoding back to the audio encoding) can be bypassed. Instead, by aggregating the sequence of audio encodings to a fixed dimension (e.g. by use of attention module 324 of FIG. 3D), the LLM can be forced to only keep information from the audio data which supplements the information from the text data for understanding semantic information.

For instance, as depicted in FIG. 3D, prior to fusion of the audio encoding from the audio encoder 312 and the text encoding from the text encoder 310, the audio encoding can be aggregated by attention module 324 such that the aggregated audio encoding is of a fixed dimension. The attention module 324 may use, for instance, transformer attention (e.g. multi headed scaled dot-product attention) to aggregate the audio encoding. The query vector 326 of attention module 324 can be provided as a constant vector of 1s.

The text encoding from the text encoder 310 and the aggregated audio encoding from the attention module 324 can then be fused by addition module 328. Addition module 328 can sum the aggregated audio encoding with the text encoding to provide fused encoding 330. In this way, the fused encoding 330 can be of a relatively smaller size (e.g. as compared to if the encoding was fused by concatenation), meaning that further processing of the fused encoding is simpler and less computationally expensive.

Figure 4A:
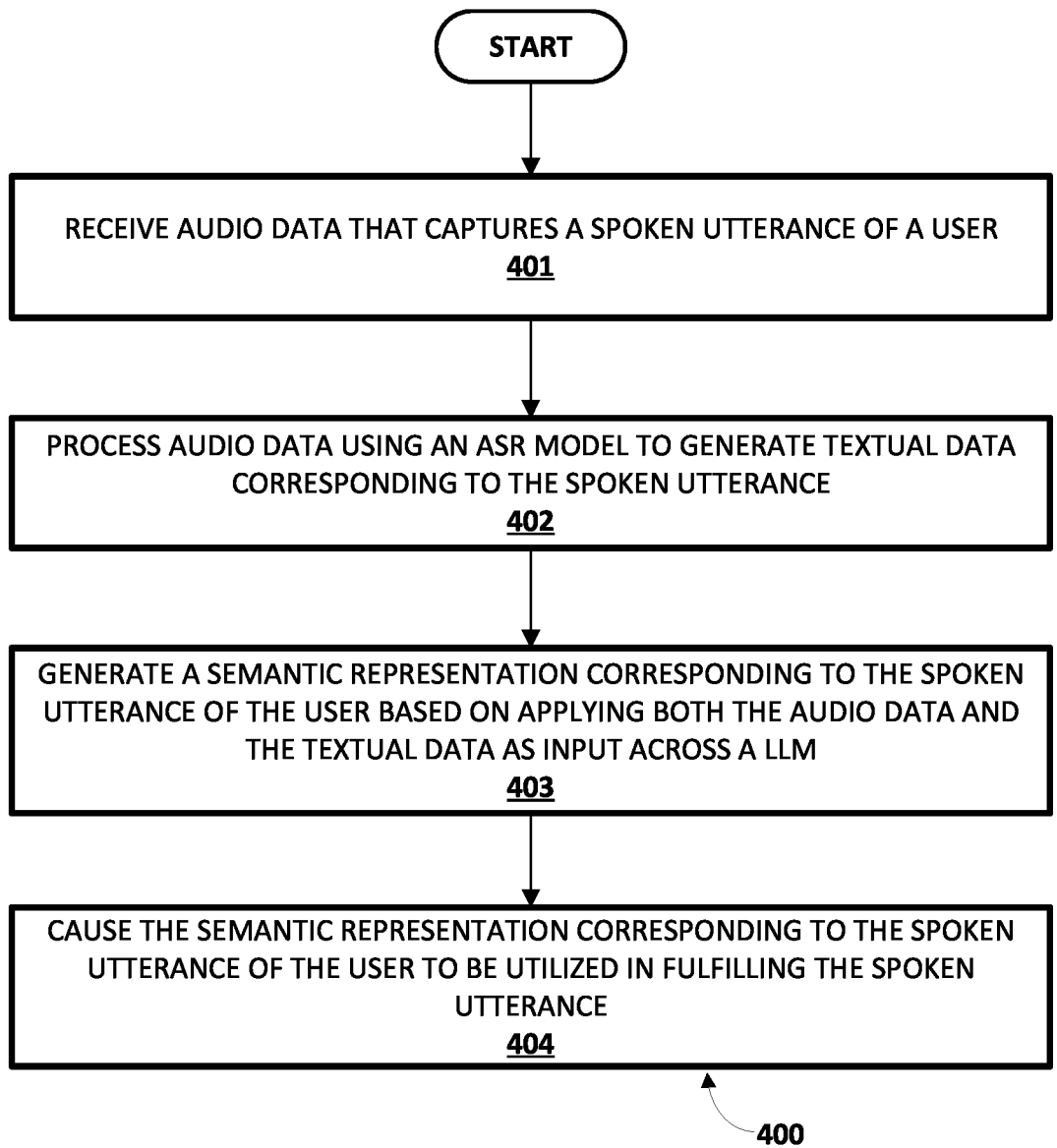
FIG. 4A and FIG. 4B depict example methods for practicing selected aspects of the present disclosure.

FIG. 4A depicts an example method for practicing selected aspects of the present disclosure. For convenience, the operations of the flowchart are described with reference to a system that performs the operations. This system may include various components of various computer systems. For instance, some operations may be performed locally on a client device, while other operations may be performed by one or more components of a remote computing system. Moreover, while operations of method 400 are shown in a particular order, this is not meant to be limiting. One or more operations may be reordered, omitted or added.

At block 401, the system receives audio data that captures a spoken utterance of a user.

At block 402, the system processes the audio data using an automatic speech recognition (ASR) model to generate textual data corresponding to the spoken utterance.

At block 403, the system generates a semantic representation corresponding to the spoken utterance of the user. The semantic representation corresponding to the spoken utterance can be generated based on applying both the audio data and the textual data as input across a large language model (LLM). The LLM can include a text encoder and an audio encoder. In some implementations, the LLM has been fine-tuned using domain specific training data for a domain, and the spoken utterance relates to the domain. For instance, the domain may relate to causing performance of one or more tasks via a telephone conversation (e.g. booking a table at a restaurant), and the LLM may have been fine-tuned for automating telephone conversations for causing performance of the one or more tasks.

In some implementations, the system determines one or more audio encodings representing the audio data. The system can further determine one or more textual encodings representing the textual data. The system can combine (or fuse) the one or more audio encodings representing the audio data and the one or more text encodings representing the textual data. The audio encodings and the textual encodings can be combined by, for instance, concatenating the one or more audio encodings representing the audio data and the one or more textual encodings representing the textual data. Additionally or alternatively, the audio encodings and the textual encodings can be aggregated by means of an attention mechanism. In some implementations, the one or both of the encodings (or sequences thereof) can be projected to a predefined dimension, prior to fusion of the encodings to ensure that they are of the same dimensionality.

In some implementations, the system determines, for each of a plurality of frames in the audio data, a corresponding embedding representing the frame in the audio data. The system can aggregate the corresponding embeddings representing each of the frames in the audio data to determine an embedding of a fixed dimension representing the audio data. In some versions of these implementations, the aggregated audio embedding and the text embedding can be summed.

At block 404, the system causes the semantic representation corresponding to the spoken utterance of the user to be utilized in fulfilling the spoken utterance. The semantic representation corresponding to the spoken utterance may include, for instance, a user intent.

In some implementations, the system can generate refined textual content corresponding to the spoken utterance based at least in part on the semantic representation corresponding to the spoken utterance. The system can cause the refined textual content to be utilized in fulfilling the spoken utterance.

In some implementations, the system can generate synthesized speech of a reply to the spoken utterance based on the semantic representation corresponding to the spoken utterance of the user. The system can cause the synthesized speech to be provided for presentation to the user. For instance, the synthesized speech can be provided audibly via loudspeakers of a client device and/or visibly via a display interface of a client device.

In some implementations, the spoken utterance from the user includes a request to perform a task. In order to fulfill the spoken utterance, the system can cause one or more actions to be performed in furtherance of completing the task.

Figure 4B:
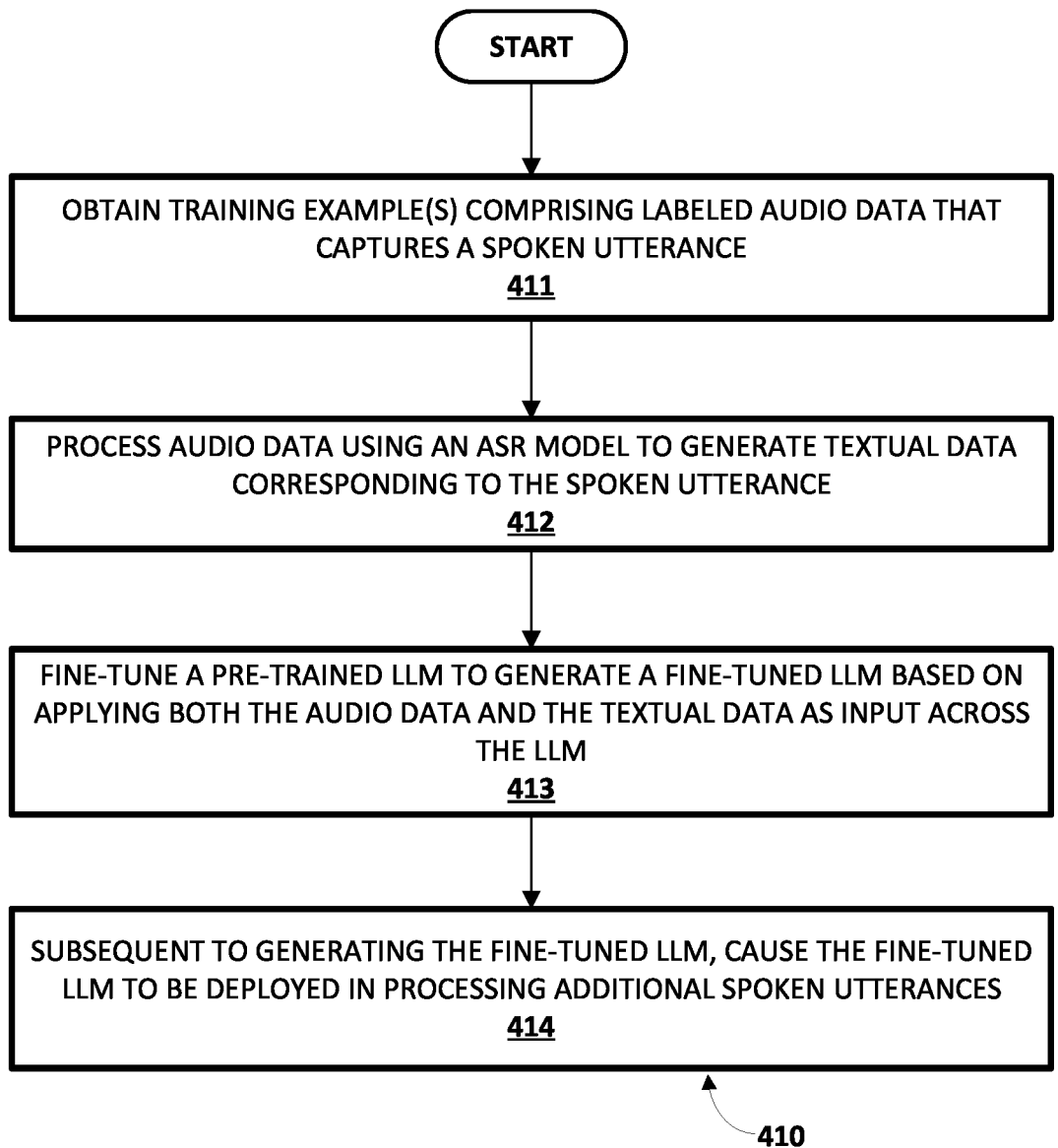

FIG. 4B depicts an example method for practicing selected aspects of the present disclosure. For convenience, the operations of the flowchart are described with reference to a system that performs the operations. This system may include various components of various computer systems. For instance, some operations may be performed locally on a client device, while other operations may be performed by one or more components of a remote computing system. Moreover, while operations of method 410 are shown in a particular order, this is not meant to be limiting. One or more operations may be reordered, omitted or added.

At block 411, the system obtains one or more training examples. Each training example can include audio data that captures a spoken utterance and a label indicative of a semantic representation corresponding to the spoken utterance. The audio data may be, for instance, part of a previous telephone conversation related to a particular domain (e.g. booking a table at a restaurant).

At block 412, the system processes the audio data using an automatic speech recognition model to generate textual data corresponding to the spoken utterance.

At block 413, the system fine-tunes a pre-trained large language model (LLM) to generate a fine-tuned LLM. The pre-trained LLM can include (i) a pre-trained audio encoder that is pre-trained to generate audio embeddings representing audio data and (ii) a pre-trained text encoder that is pre-trained to generate textual embeddings representing textual data. The fine-tuning can be based on applying both the audio data and the textual data as input across the LLM. In this way, the LLM can provide a semantic representation corresponding to the spoken utterance. This can be compared with the label indicative of a semantic representation corresponding to the spoken utterance, and the model can be fine-tuned based on the comparison.

At block 414, the system causes the fine-tuned LLM to be deployed in processing additional spoken utterances (e.g. as described in relation to FIG. 4A).

Figure 5:
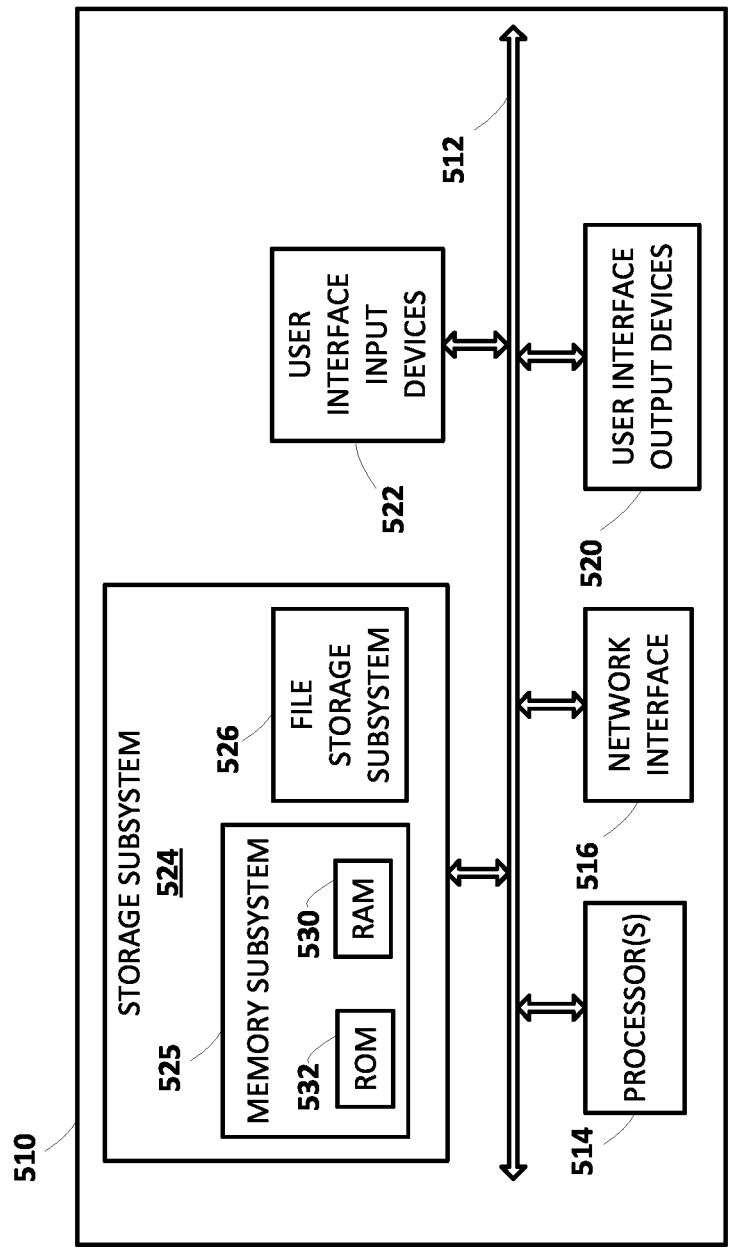
FIG. 5 schematically depicts an example architecture of a computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of the methods disclosed herein. Memory 525 used in the storage subsystem 524 can include a number of memories including a main random-access memory (RAM) 530 for storage of instructions and data during program execution and a read only memory (ROM) 532 in which fixed instructions are stored. A file storage subsystem 526 can provide persistent storage for program and data files, and may include a hard disk drive, a CD-ROM drive, an optical drive, or removable media cartridges. Modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple buses.

Computer system 510 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors of a computing device is provided, and includes: receiving audio data that captures a spoken utterance of a user. The method further includes processing the audio data using an automatic speech recognition (ASR) model to generate textual data corresponding to the spoken utterance. The method further includes generating a semantic representation corresponding to the spoken utterance of the user based on applying both the audio data and the textual data as input across a large language model (LLM). The method further includes causing the semantic representation corresponding to the spoken utterance of the user to be utilized in fulfilling the spoken utterance.

These and other implementations of the technology disclosed herein can optionally include one or more of the following features.

In some implementations, the semantic representation corresponding to the spoken utterance includes a user intent.

In some additional or alternative implementations, applying both the audio data and the textual data as input across the large language model includes: determining one or more audio encodings representing the audio data, determining one or more textual encodings representing the textual data, and combining the one or more audio encodings representing the audio data and the one or more textual encodings representing the textual data. In some further versions of those implementations, combining the one or more audio encodings representing the audio data and the one or more textual encodings representing the textual data includes at least one of: concatenating the one or more audio encodings representing the audio data and the one or more textual encodings representing the textual data, and aggregating the one or more audio encodings representing the audio data and the one or more textual encodings representing the textual data by: using an attention mechanism to generate a context vector from the textual data to the audio data; and summing the context vector with the one or more textual encodings representing the textual data.

In additional or alternative versions of those implementations, the method may further include: for each of a plurality of frames in the audio data, determining a corresponding encoding representing the frame in the audio data; and aggregating the corresponding encodings representing each of the frames in the audio data to determine an aggregated audio encoding of a fixed dimension representing the audio data. In yet further versions of those implementations, combining the one or more audio encodings representing the audio data and the one or more textual encodings representing the textual data includes summing the aggregated audio encoding representing the audio data and the textual encoding representing the textual data.

In some additional or alternative implementations, the method may further include generating refined textual content corresponding to the spoken utterance based at least in part on the semantic representation corresponding to the spoken utterance. In some versions of those implementations, the method may further include causing the refined textual content to be utilized in fulfilling the spoken utterance.

In some additional or alternative implementations, the method may further include: generating synthesized speech of a reply to the spoken utterance based on the semantic representation corresponding to the spoken utterance of the user; and causing the synthesized speech to be provided for presentation to the user. In some versions of those implementations, causing the synthesized speech to be provided for presentation to the user may include causing the synthesized speech to be provided for audible presentation to the user.

In some additional or alternative implementations, the spoken utterance from the user may include a request to perform a task, and fulfilling the spoken utterance may include causing one or more actions to be performed in furtherance of completing the task.

In some additional or alternative implementations, the LLM may include a text encoder and an audio encoder.

In some additional or alternative implementations, the LLM has been fine-tuned using domain specific training data for a domain, and the spoken utterance relates to the domain. In some versions of those implementations, the domain relates to causing performance of one or more tasks via a telephone conversation, and the LLM has been fine-tuned for automating telephone conversations for causing performance of the one or more tasks.

In some implementations, a method implemented by one or more processors of a computing device is provided and includes: obtaining a training example, wherein the training example includes audio data that captures a spoken utterance and a label indicative of a semantic representation corresponding to the spoken utterance. The method further includes processing the audio data using an automatic speech recognition model to generate textual data corresponding to the spoken utterance. The method further includes fine-tuning a pre-trained large language model (LLM) to generate a fine-tuned LLM based on applying both the audio data and the textual data as input across the LLM, the pre-trained LLM comprising (i) a pre-trained audio encoder that is pre-trained to generate audio embeddings representing audio data and (ii) a pre-trained text encoder that is pre-trained to generate textual embeddings representing textual data. The method further includes, subsequent to generating the fine-tuned LLM, causing the fine-tuned LLM to be deployed in processing additional spoken utterances.

These and other implementations of the technology disclosed herein can optionally include one or more of the following features.

In some versions of those implementations, the audio data in the training example is part of a previous telephone conversation related to a particular domain.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors of a computing device, the method comprising:
receiving audio data that captures a spoken utterance of a user;
processing the audio data using an automatic speech recognition (ASR) model to generate textual data corresponding to the spoken utterance;
generating a semantic representation corresponding to the spoken utterance of the user based on applying both the audio data and the textual data as input across a large language model (LLM), wherein applying both the audio data and the textual data as input across the large language model comprises:
determining one or more audio encodings representing the audio data;
determining one or more textual encodings representing the textual data; and
combining the one or more audio encodings representing the audio data and the one or more textual encodings representing the textual data, wherein combining the one or more audio encodings representing the audio data and the one or more textual encodings representing the textual data comprises at least one of:
concatenating the one or more audio encodings representing the audio data and the one or more textual encodings representing the textual data, and
aggregating the one or more audio encodings representing the audio data and the one or more textual encodings representing the textual data by:
using an attention mechanism to generate a context vector from the textual data to the audio data; and
summing the context vector with the one or more textual encodings representing the textual data; and
causing the semantic representation corresponding to the spoken utterance of the user to be utilized in fulfilling the spoken utterance.

2. The method of claim 1, wherein the semantic representation corresponding to the spoken utterance comprises a user intent.

3. The method of claim 1, further comprising:
for each of a plurality of frames in the audio data, determining a corresponding encoding representing the frame in the audio data; and
aggregating the corresponding encodings representing each of the frames in the audio data to determine an aggregated audio encoding of a fixed dimension representing the audio data.

4. The method of claim 3 wherein combining the one or more audio encodings representing the audio data and the one or more textual encodings representing the textual data comprises:
summing the aggregated audio encoding representing the audio data and the textual encoding representing the textual data.

5. The method of claim 1, further comprising:
generating refined textual content corresponding to the spoken utterance based at least in part on the semantic representation corresponding to the spoken utterance.

6. The method of claim 5, further comprising:
causing the refined textual content to be utilized in fulfilling the spoken utterance.

7. The method of claim 1, further comprising:
generating synthesized speech of a reply to the spoken utterance based on the semantic representation corresponding to the spoken utterance of the user; and
causing the synthesized speech to be provided for presentation to the user.

8. The method of claim 7, wherein causing the synthesized speech to be provided for presentation to the user comprises:
causing the synthesized speech to be provided for audible presentation to the user.

9. The method of claim 1, wherein the spoken utterance from the user includes a request to perform a task, and fulfilling the spoken utterance comprises:
causing one or more actions to be performed in furtherance of completing the task.

10. The method of claim 1, wherein the LLM comprises a text encoder and an audio encoder.

11. The method of claim 1, wherein the LLM has been fine-tuned using domain specific training data for a domain, and the spoken utterance relates to the domain.

12. The method of claim 11, wherein the domain relates to causing performance of one or more tasks via a telephone conversation, and the LLM has been fine-tuned for automating telephone conversations for causing performance of the one or more tasks.

13. A method implemented by one or more processors of a computing device, the method comprising:
obtaining a training example, wherein the training example comprises audio data that captures a spoken utterance and a label indicative of a semantic representation corresponding to the spoken utterance;
processing the audio data using an automatic speech recognition model to generate textual data corresponding to the spoken utterance;
fine-tuning a pre-trained large language model (LLM) to generate a fine-tuned LLM based on applying both the audio data and the textual data as input across the LLM, the pre-trained LLM comprising (i) a pre-trained audio encoder that is pre-trained to generate audio embeddings representing audio data and (ii) a pre-trained text encoder that is pre-trained to generate textual embeddings representing textual data; and
subsequent to generating the fine-tuned LLM, causing the fine-tuned LLM to be deployed in processing additional spoken utterances.

14. The method of claim 13, wherein the audio data in the training example is part of a previous telephone conversation related to a particular domain.

15. A system comprising:
at least one processor; and
memory storing instructions that, when executed, cause the at least one processor to perform operations, the operations comprising:
receiving audio data that captures a spoken utterance of a user;
processing the audio data using an automatic speech recognition (ASR) model to generate textual data corresponding to the spoken utterance;
generating a semantic representation corresponding to the spoken utterance of the user based on applying both the audio data and the textual data as input across a large language model (LLM), wherein applying both the audio data and the textual data as input across the large language model comprises:
determining one or more audio encodings representing the audio data;

determining one or more textual encodings representing the textual data; and combining the one or more audio encodings representing the audio data and the one or more textual encodings representing the textual data, wherein combining the one or more audio encodings representing the audio data and the one or more textual encodings representing the textual data comprises at least one of:

concatenating the one or more audio encodings representing the audio data and the one or more textual encodings representing the textual data, and aggregating the one or more audio encodings representing the audio data and the one or more textual encodings representing the textual data by:

using an attention mechanism to generate a context vector from the textual data to the audio data; and summing the context vector with the one or more textual encodings representing the textual data; and causing the semantic representation corresponding to the spoken utterance of the user to be utilized in fulfilling the spoken utterance.

16. The system of claim 15, wherein the semantic representation corresponding to the spoken utterance comprises a user intent.

* * * * *